United States Patent [19]

Lammer et al.

[11] Patent Number: 4,522,453

[45] Date of Patent: Jun. 11, 1985

[54] TRIBOLOGICAL COATINGS FOR THE PROTECTION OF MOVING MACHINE PARTS FROM WEAR AND CORROSION

[75] Inventors: Johann Lammer, Cormondreche; Hans R. Kocher, Pesseux; Hans-Erich Hintermann, Ins, all of Switzerland

[73] Assignee: Laboratoire Suisse de Recherches Horlogeres, Neuchatel, Switzerland

[21] Appl. No.: 419,185

[22] Filed: Sep. 17, 1982

Related U.S. Application Data

[63] Continuation of Ser. No. 180,578, Aug. 25, 1980, abandoned, which is a continuation of Ser. No. 24,421, Mar. 27, 1979, abandoned.

[30] Foreign Application Priority Data

Jul. 21, 1978 [CH] Switzerland .......................... 7872/78

[51] Int. Cl.$^3$ .............................................. F16C 17/00
[52] U.S. Cl. .............................. 308/3 R; 308/DIG. 8; 428/386; 428/698
[58] Field of Search ...................... 501/88, 91, 92, 93, 501/154; 252/12; 428/698, 699, 385, 386; 308/3 R, DIG. 8

[56] References Cited

U.S. PATENT DOCUMENTS 3,497,272  2/1970  Caubet ................................. 308/3 R
3,522,974  8/1970  Polti ..................................... 308/3 R
3,711,171  1/1973  Orkin et al. ........................... 252/12

FOREIGN PATENT DOCUMENTS 991421  5/1965  United Kingdom .

OTHER PUBLICATIONS

"Wear-Resistant Coatings for Bearing Applications", by H. E. Hintermann et al., (Text of Talk Held at Space Tribology Workshop, Risley, Great Britain, May 25–27, 1977).

*Primary Examiner*—Marion E. McCamish
*Assistant Examiner*—William M. Atkinson
*Attorney, Agent, or Firm*—Parkhurst & Oliff

[57] ABSTRACT

Machine parts are disclosed which are subjected to rolling or sliding conditions, wherein the friction partners are protected by layers with low static and dynamic coefficients of friction which are selected with regard to their tribological properties and whereby the layers are constituted by carbides and/or nitrides and/or carbonitrides and/or borides and/or silicides and/or oxides of an element or elements selected from Groups III to VIII of the Periodic Table in the form of mixtures or mixed crystals which are deposited in a suitable manner and, according to their physiochemical properties, are combined for the particular application. Preferably one of the friction partners comprises TiC or MoSi$_2$ and the other comproses TiN or SiC or Si$_3$N$_4$.

1 Claim, No Drawings

TRIBOLOGICAL COATINGS FOR THE PROTECTION OF MOVING MACHINE PARTS FROM WEAR AND CORROSION

This is a continuation of application Ser. No. 180,578 filed Aug. 25, 1980, abandoned Jan. 20, 1984, which in turn is a continuation of application Ser. No. 24,421, filed Mar. 27, 1979, abandoned Oct. 31, 1980.

It has been shown in various prior art application and process patents that hard coatings based on the nitrides, carbides, carbonitrides, borides, silicides and oxides of the elements selected from groups III to VIII of the Periodic Table have good wear-resistant properties. By careful pairing of these hard coatings, a significant improvement of the properties of moving machine parts can be achieved, especially for applications under extreme environmental conditions.

Extreme environmental conditions are characterized by the influence of high temperature and/or high pressure and/or high vacuum and/or the presence of chemically active, corrosive media. These extreme environmental conditions occur particularly in chemical process technology, in nuclear technology, in outer-space technology, and in weapons technology. They result in chemical attack which leads to corrosion and premature failure of the moving machine parts and also in excessive wear for nuclear and outer-space applications due to the unfavorable friction properties of classical construction materials at high temperature and in high vacuum.

The present invention is aimed at providing means for the construction of apparatus and machines for applications under extreme environmental conditions by the use of suitable protective coatings on clasical construction materials. Furthermore, the use of such protective coatings in conventional machine construction increases the reliability and useful lifetime of the parts concerned. By the deposition of carbides, nitrides and carbonitrides, borides, silicides, and oxides of the elements from groups III to VIII of the Periodic Table on to metallic and non-metallic materials the required surface properties for the particular application are readily established.

The deposition may be made chemically by gas phase reactions or physically or by means of solid state or liquid phase transport reactions.

The selection of the particular coating combination in any given instance depends on the physical-chemical properties required for the particular application and the suitability of the substrate for the particular coating method.

According to well established theory of friction and wear, the elements in frictional contacts are paired to be hard and smooth, respectively, and to have no mutual solubility. The tribological couples described herein have high hardness and are completely miscible, and their use is fully demonstrated by the following Examples which characterize the present invention:

EXAMPLE 1

The chemical processing industry uses, to an increasing extent, low pressures in the middle and high vacuum range in order to establish certain thermodynamic equilibria for the synthesis of many new materials. The reaction (and/or cracking) by-products produced during these syntheses are often acidic or basic vapors which corrode the vacuum pump components.

The rotary piston and vane pumps which, together with cold traps, are used in the chemical processing industry nowadays need continuous servicing in order to provide the necessary reliability and useful lifetime when handling acidic and basic vapors.

According to the present invention the pump cavity is coated with titanium nitride and the rotating pump components, such as pistons or vanes, with titanium carbide.

The titanium nitride and titanium carbide are applied to the pump parts to be protected in the form of a 2–5 $\mu$m thick, crack-free coating by any conventional method, e.g., the chemical vapor deposition process according to Swiss Pat. No. 452,205 which can be used to coat metallic and non-metallic components.

The friction partners titanium carbide and titanium nitride have a low dynamic and static coefficient of friction and outstanding wear-resistant properties.

Since the coefficient of friction TiC—TiN is essentially constant under varying temperature, pressure and humidity conditions, the thus-protected pump elements are less affected by faults in the lubrication system and have outstanding emergency running properties.

Furthermore, the corrosion resistant TiN and TiC coatingsprotect the pump elements such as pistons, rotary vanes, cavity, etc., from chemical attack, and it is therefore possible to make conventional pumps suitable for the demanding requirements of the chemical industry without having to resort to expensive special constructions.

The foregoing means of protection, which improves the tribological and mechanical properties of vacuum pumps, can also be used for the handling of corrosive liquids and melts.

EXAMPLE 2

In order to improve the thermal efficiency of helium-cooled nuclear reactors, it is necessary to go to even higher temperatures (up to 900° C.). These high temperatures in high purity noble gases result in the desorption of all protective oxide layers on the surface of tribologically functional components. This gives rise to a strong tendency for welding to take place between the friction partners and hence an unacceptably high coefficient of friction.

The high pressures which occur together with the high temperatures make it advantageous in the tribology of nuclear reactor armatures to exploit the relatively constant coefficient of friction TiC—TiN as well as the properties of TiC and TiN as diffusion barriers.

Bearings for pressures up to 250Mp on each contact point may be prepared without cages and with a TiC coating either on the rolling elements (balls or rolls) or on the rings and with a TiN coating on the opposite partner. The material of construction of the rings and rolling elements must be chosen according to the temperature and tolerance requirements of the bearing.

The low coefficient of friction TiC—TiN ensures bearing operation with good friction properties and reduces welding of the bearing components during long shut-down periods. Depending on the dynamic requirements of the bearing, a dry lubricant may be added in the form of sputtered $MoS_2$.

The present invention therefore allows conventional construction materials to be used for tribological components in nuclear reactor technology.

EXAMPLE 3

In blast furnace construction, bearing elements must operate under an oxidizing atmosphere at temperatures up to 850° C. By coating the rolling elements with $Si_3N_4$ and their corresponding race-track with $MoSi_2$ the good oxidation resistance of $Si_3N_4$ and the good friction properties of $MoSi_2$ may be exploited so that conventional materials may readily be used in a temperature range which would otherwise have been impossible.

Attention is invited to our copending application Ser. No. 869,699, filed Jan. 16, 1978.

What is claimed is:

1. A tribological system, comprising:
a first machine element and a second machine element, in rolling or sliding contact with one another, coated with hard, wear-resistant layers of different compositions and having low static and dynamic coefficients of friction between each other, wherein said first machine element is coated with a hard, wear-resistant layer of TiC, and said second machine element is coated with a hard, wear-resilient layer of TiN, said hard, wear-resilient layers covering said first and second machine elements with a protective and smooth tribologically coupled layer.

* * * * *